E. F. MILLER.
APPARATUS FOR MANUFACTURING CATHETERS AND THE LIKE.
APPLICATION FILED NOV. 3, 1921.
1,404,042. Patented Jan. 17, 1922.
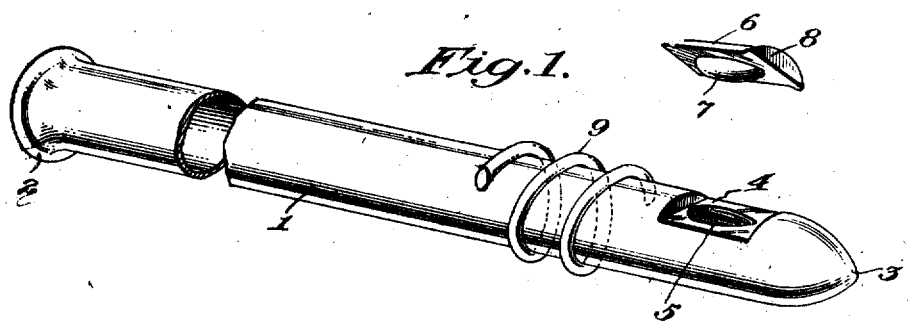
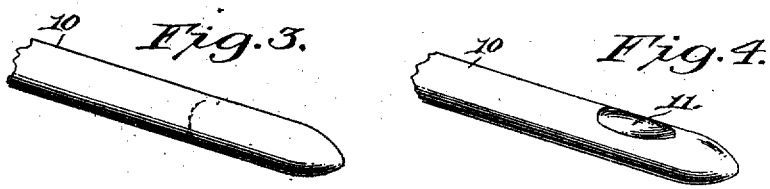 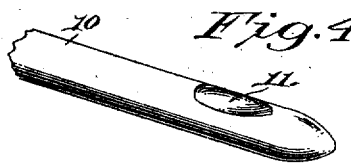
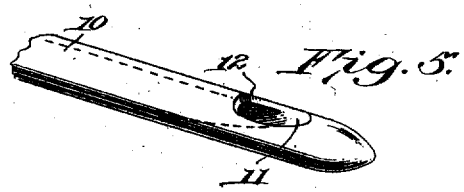
Inventor
Everard F. Miller
By Percy B. Hills
Attorney

UNITED STATES PATENT OFFICE.

EVERARD F. MILLER, OF ASHLAND, OHIO, ASSIGNOR TO THE FAULTLESS RUBBER COMPANY, OF ASHLAND, OHIO, A CORPORATION OF OHIO.

APPARATUS FOR MANUFACTURING CATHETERS AND THE LIKE.

1,404,042.

Specification of Letters Patent. Patented Jan. 17, 1922.

Application filed November 3, 1921. Serial No. 512,632.

*To all whom it may concern:*

Be it known that I, EVERARD F. MILLER, a citizen of the United States, residing at Ashland, county of Ashland, State of Ohio, have invented certain new and useful Improvements in Apparatus for Manufacturing Catheters and the like, of which the following is a specification.

My invention relates to the manufacture of rubber catheters, stomach tubes, and the like, and has for its object to provide an improved apparatus for vulcanizing such articles, and at the same time forming therein the depression in one side near the closed end wherein the aperture communicating with the interior of the tube afterwards is made to complete the same.

In the manufacture of these articles heretofore, it has been the practice, first, to insert into one end of a suitable length of unvulcanized rubber tubing a plug of similar unvulcanized rubber; then to roll that end in any suitable manner to form the same into a blunt point; then to insert the same into a tube, usually formed of glass, and which has near its closed end an inwardly projecting elongated protuberance of a shape to form in the tube when vulcanized a depression in one side thereof near its closed end, which afterwards is apertured to communicate with the interior of the tube at that point. The glass tube with the rubber article thus inserted then is subjected to vulcanizing heat and the article properly vulcanized in the usual manner, and when withdrawn is ready for the final operation of cutting the hole therein, as hereinbefore described. Devices of this character are highly objectionable primarily for the reason that it is somewhat difficult, first, to insert into the glass tube the rubber tube to be shaped and vulcanized, because of the inward projection which must be passed. My invention is intended primarily to obviate this objection, which I accomplish by providing a removable protuberance, which can be inserted into position after the rubber tube is inserted into the exterior tube, and which may be removed therefrom before the withdrawal of the vulcanized tube.

In the accompanying drawing:—

Figure 1 is a perspective view of my improved device with the protuberance carrying section shown detached.

Figure 2 is an enlarged longitudinal sectional view of the closed end of the outer tube with the rubber tube inserted therein and after vulcanization has taken place.

Figure 3 is a detail view of one end of the rubber tube before vulcanization and after it has had the plug inserted and its end rolled into the blunt point.

Figure 4 is a view similar to Figure 3, showing the tube after vulcanization and removal from the exterior tube.

Figure 5 is a similar view showing the completed article.

Similar numerals of reference denote corresponding parts in the several views.

In the said drawing, the reference numeral 1 denotes the exterior tube formed of metal, preferably of aluminum on account of its lightness, the same being flared at its open end at 2 and closed into a blunt point at its other end at 3. By cutting away the surface of said tube transversely, as shown at 4, said cut extending sufficiently into the body of the tube on a straight line to intersect its interior diameter, I form an elongated aperture 5 therein in a manner readily understood, the wall of the tube around said aperture forming a seat. Adapted to fit in said cut or groove is a closure member 6, formed on its inner surface with a protuberance 7 adapted substantially to fit the aperture 5, said closure member being shaped on its exterior surface substantially to conform to the exterior contour of the tube 1. Preferably I form said closure member of a thickness sufficient to cause it when positioned to project slightly beyond the exterior surface of the tube 1 and at its end nearest the blunt point 3 of said tube 1, I form a transverse bead 8 for a purpose hereinafter to be described. Mounted slidably upon the tube 1 is a coiled spring 9, which will possess sufficient resiliency, when the closure member 6 is positioned in said tube, to be slid thereover and firmly engage the same to retain it in its adjusted position with considerable pressure, the transverse bead acting as a stop to limit the movement of said spring in that direction. By making the closure member 6 slightly projecting above the surface of the tube 1, as hereinbefore described, it will be understood that the spring when forced thereover will be put under tension to exert its retaining action thereon, and yet be free to slide upon the tube 1, in a manner readily understood.

In operation, the closure member 6 is removed, and the rubber tube 10 to be vulcan ized is inserted into the tube 1 to the position shown in Figure 2, where its pointed end will fit the interior configuration of said outer tube, and upon the insertion of the closure member 6 to position the protuberance 7 thereof will be forced into the side 8 of said tube 10, forming therein the depression 11 shown in Figure t. The spring 9 is then slid over the closure member 6, retaining it firmly in position, whereupon the tube 1 with its contained tube 10 may be subjected to the usual vulcanizing operation, thereby fixing in said tube 10 the depression 11 in a manner readily understood. Upon the completion of the vulcanizing operation, the spring 9 may be slid backwards, and the closure member 6 removed, which will permit the ready withdrawal of the tube 10 from the enclosing tube 1. The article so produced, as shown in Figure 4, may then be completed by forming therein the aperture 12, the same communicating with the interior of said tube.

In Figure 2, which is a view of the article after vulcanization is completed, the plug which has been inserted in the end of the tube 10 has become incorporated with the body of said tube, and therefore does not show as a separate element. It will be understood that the object of inserting this plug is to close that end of the tube against the collection of matter in its use, making the article very much more sanitary than if the same were omitted. However, no claim is made to this feature of the article, as the same has been for some time well known in the manufacture of this class of devices.

In the manufacture of these articles heretofore, it has been the practice to form the outer tube 1 of glass, primarily for the reason that it would be a very difficult matter to make a metal tube with a projection on its inner surface that would meet the requirements, for the reason that a very smooth surface is required, which would be almost impossible to obtain. By substituting a removable projection, it is possible to employ metal, such as aluminum, and polish the inside thereof to as high a degree as necessary before closing one end thereof by a spinning process. Furthermore, in employing glass tubes in the manufacture of these articles, it has been necessary to draw the articles to place by forming a small hole in the closed end of the glass tube 1 and applying thereto a vacuum, or by dropping the unvulcanized article into the tube and then pounding the end gently on a wooden block in order to force it past the depression and gradually into place. By using glass it also can be determined when the rubber tube 10 is properly inserted to its limit therein. With my improved construction, the necessity for employing glass is obviated, as there is no obstruction to the complete insertion of the rubber tube, and, therefore, no necessity for visual inspection thereof. It also will be understood that in employing glass for this purpose, its fragile character is such that the breakage becomes a serious expense, which is obviated by employing metal as hereinbefore described.

Having thus described my invention, what I claim as new and desire to secure by Letters Patent, is:—

1. An apparatus of the character described, comprising a vulcanizing tube closed at one end and apertured in its side near said closed end, a closure member adapted removably to fit said aperture and having a protuberance on its inner face adapted to project into said tube when said closure member is positioned therein, and means for locking said closure member in position in said tube.

2. An apparatus of the character described, comprising a vulcanizing tube closed at one end and apertured in its side near said closed end, a closure member adapted removably to fit said aperture and having a protuberance on its inner face adapted to project into said tube when said closure member is positioned therein, and a coiled spring slidably mounted on said tube for detachably engaging over said closure member to lock the same in position in said tube.

3. An apparatus of the character described, comprising a vulcanizing tube closed at one end and cut away on one side near said closed end to form an elongated aperture therein surrounded by a flat wall, a closure member adapted removably to fit said aperture and having a protuberance on its inner face adapted to project into said tube when said closure member is positioned therein, said exterior surface of said closure member conforming to the exterior contour of the tube, and a coiled spring slidably mounted on said tube for detachably engaging over said closure member to lock the same in position in said tube.

In testimony whereof, I hereunto affix my signature.

EVERARD F. MILLER.